United States Patent [19] [11] 4,027,309
Manning et al. [45] May 31, 1977

[54] INK JET PRINTER APPARATUS AND METHOD OF PRINTING

[75] Inventors: Donald Franklin Manning, Endicott; Bruce Allen Wolfe, Johnson City, both of N.Y.

[73] Assignee: International Business Machines Corporation, Armonk, N.Y.

[22] Filed: Apr. 28, 1976

[21] Appl. No.: 680,814

[52] U.S. Cl. .......... 346/1; 346/75
[51] Int. Cl.[2] .......... G01D 15/18
[58] Field of Search .......... 346/75, 140, 1

[56] References Cited

UNITED STATES PATENTS

| | | | |
|---|---|---|---|
| 3,864,692 | 2/1975 | McDonnell | 346/75 |
| 3,992,712 | 11/1976 | Dill | 346/75 X |

OTHER PUBLICATIONS

Myers; R. A., Hybrid Electrostatic–Magnetic Ink Jet, IBM Tech. Disc. Bulletin, vol. 17, No. 10, Mar. 1975, p. 3065.
Heard; R. S., Electrostatic/Magnetic Ink Jet System, IBM Tech. Disc. Bulletin, vol. 18, No. 4, Sept. 1975, pp. 1115–1117.

*Primary Examiner*—Joseph W. Hartary
*Attorney, Agent, or Firm*—Paul M. Brannen

[57] ABSTRACT

An ink jet printer apparatus and method using ink carrying magnetizable particles, the ink being passed as a stream of droplets sequentially through an electromagnetic field and an electrostatic field, in that order. The droplets are selectively charged electrostatically. All drops are subjected to a time dependent magnetic flux field which effects scans of the drops at a recording surface. Drops not to be used are deflected by electrostatic deflection plates to a gutter.

8 Claims, 5 Drawing Figures

INK JET PRINTER APPARATUS AND METHOD OF PRINTING

BACKGROUND OF THE INVENTION

1. Field of the Invention

This invention relates to ink jet printer apparatus and in particular to ink jet printer method and apparatus in which both magnetic and electrostatic deflection of the ink stream are employed.

2. Description of the Prior Art

Ink jet printing methods and apparatus are generally well known and comprise the projection of a continuous stream of ink droplets toward a record medium, such as a sheet of paper. Deflection of the drops in a given direction, plus relative motion of the medium and/or deflection in a direction orthogonal to the first direction, will produce a dot matrix pattern on the record medium. In instances where the dot position is to be blank, the unused drop or drops are deflected to an ink gutter from whence they can be returned to the ink supply system. Both electrostatic and magnetic deflection systems are employed. Also electrostatic and magnetic deflection hybrid systems are known, as illustrated in and IBM Technical Disclosure Bulletin, September 1975, page 1115.

Magnetic selection of wanted and unwanted drops is limited in usefulness because of the relatively slow field switching rates and power dissipation problems. Similarly, electrostatic deflection involves charge interaction problems.

SUMMARY OF THE INVENTION

It is an object of this invention to provide a method and apparatus for ink jet printing which overcomes the above cited problems, and provides an increase in printing speed.

Another object of the invention is to provide an improved method and apparatus for ink jet printing, of hybrid form, utilizing magnetic deflection and electrostatic drop selection, in that order.

A further object of the invention is to provide an improved apparatus for ink jet printing which utilizes common component elements for multiple ink nozzle fabrication.

The foregoing and other objects and advantages are attained by this invention by providing a configuration which produces a stream of magnetic ink droplets, directed along a path or trajectory toward a recording medium or impacting surface, inducing electrical charges on selected ones of said drops, creating a variable magnetic force field of nonuniform flux density across the path to urge deflection of a series of the drops from the path to impact the recording surface along a line, and establishing an electrostatic force field across the droplet path for deflection of the charged drops from said path along a trajectory which will result in the nonselected drops being discarded before reaching the recording surface.

The apparatus includes a nozzle assembly adapted, by suitable vibratory means, to deliver a stream of droplets of magnetizable ink. The parts are arranged so that the drops are formed within a hollow charge electrode which may be a hole in a plate, or a ring, as the stream is directed along a trajectory toward a recording surface. Following the charge electrode, an electromagnet is provided having an air gap through which the stream of droplets passes. The electromagnet is energized by a timevariant signal to produce a magnetic flux field which deflects the droplets horizontally in accordance with the duration and magnitude of the flux field affecting the drops. Next the drops pass through a pair of charged deflecting plates or electrodes.

The deflection electrodes will cause the charge droplets to be deflected in a vertical direction. The nonselected droplets will not travel on to impact the recording surface, but instead will enter a gutter, from whence they are returned to the ink supply system for re-use.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings.

Similar reference characters refer to similar parts in each of the several views.

DETAILED DESCRIPTION OF THE PREFERRED EMBODIMENTS

Figure 1:
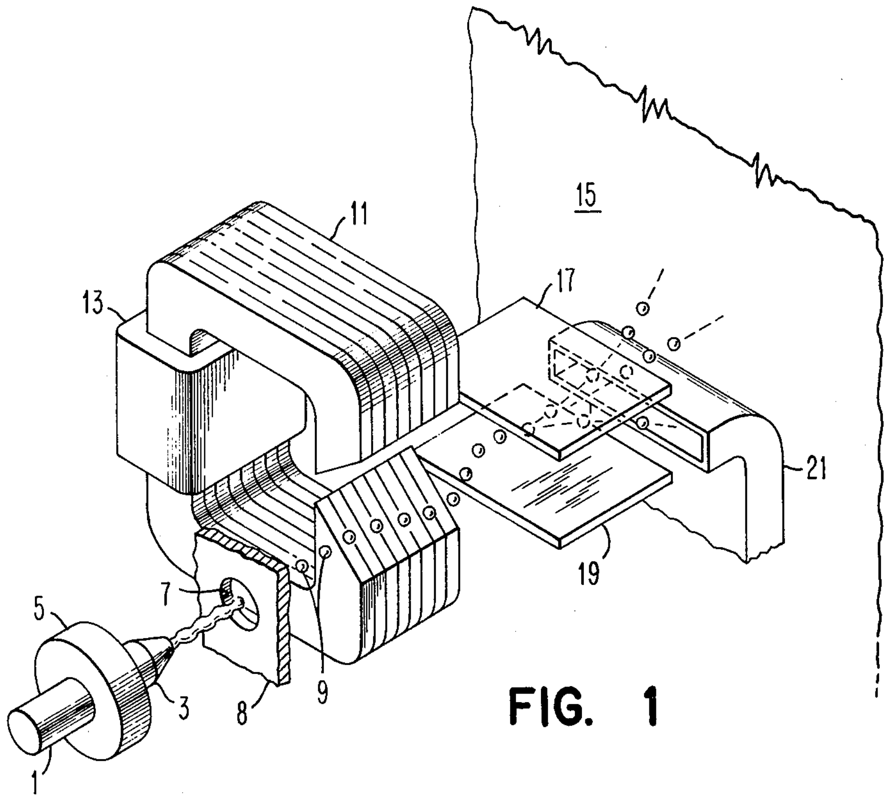
FIG. 1 is an isometric schematic view of ink jet printing apparatus according to a preferred embodiment of the invention.

Referring to the drawings, and particularly to FIG.1, an ink jet printer apparatus is shown, having means for generating a stream of magnetizable ink droplets, comprising a supply tube 1 which supplies magnetizable ink under suitable pressure from a source not shown, to a nozzle 3, which is vibrated or excited by a vibrator element 5, in a manner well known in the art to cause the stream of ink issuing from nozzle 3 to break up into a series of droplets as shown. The droplets break off from the continuous stream in the vicinity of a charge electrode 7 mounted in an insulating plate 8, which selectively imparts charge or no charge to the drops to provide the necessary selection between printing and not printing for any given matrix position.

Figure 2:
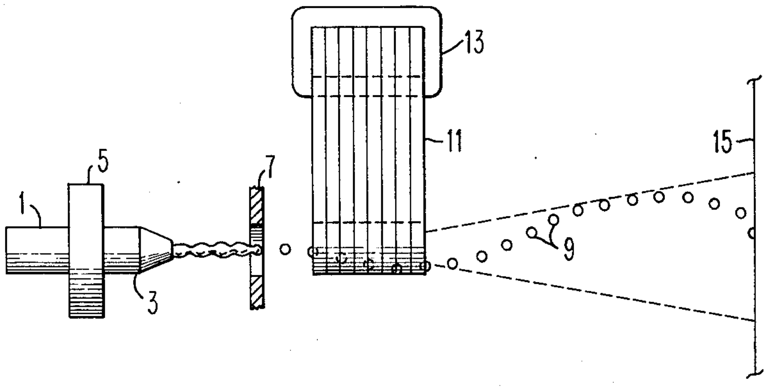
FIG. 2 is a partial top view of the apparatus of FIG. 1, illustrating the magnetic deflection feature as it acts in a horizontal plane.

The droplets 9 then pass through an electromagnetic deflector means comprising a C-shaped laminated core 11 having a winding 13 mounted thereon. The air gap is beveled as shown, and when the winding 13 is energized by a suitable current waveform, the droplets will be attracted toward the narrower end of the gap. Suitable selection of the design parameters will provide magnetic deflection of the droplets horizontally, as can be more clearly seen in FIG. 2. The selected drops finally reach and are deposited on the paper or other record surface 15. This arrangement provides the means to cover an area in one direction while continuous motion of either the entire print head assembly or the recording surface provides the coverage in a direction orthogonal to the first direction.

Figure 3:
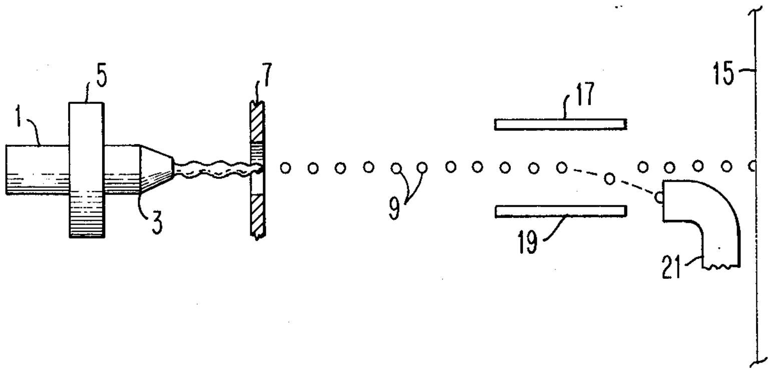
FIG. 3 is a partial side view of the apparatus of FIG. 1, illustrating the electrostatic selection feature as it acts in a vertical plane.

Electrostatic deflection is used to deflect unwanted droplets to a collector or gutter. This deflection is in a direction perpendicular to the plane of the magnetic deflection. This arrangement is most clearly seen in FIG. 3. The drops are shown passing in a horizontal plane between the selector plates 17 and 19. When a voltage of appropriate polarity is applied to the opposed plates, the charged droplets will be deflected downwardly so that they enter a collector or gutter 21, rather than the recording surface 15. Thus no printing takes place in the predetermined position points in the matrix.

The provision of this method and apparatus, wherein the drops are magnetically deflected to different printing positions and are electrostatically selected for printing or nonprinting, combines the best qualities of the two techniques of drop displacement. Using the magnetic deflection of the drops reduces the charge interaction problems encountered when electrostatic deflection is employed, and, on the other hand, the use of electrostatic selection of drops for printing or nonprinting increases the speed or drop rate capabiltiy, since magnetic selection is limited by field switching rates and power dissipation problems. It will be appreciated by those skilled in the art that the charged drops could be used for printing, while nonselected drops would not be charged and would follow a nondeflected trajectory to a gutter.

Figure 4:
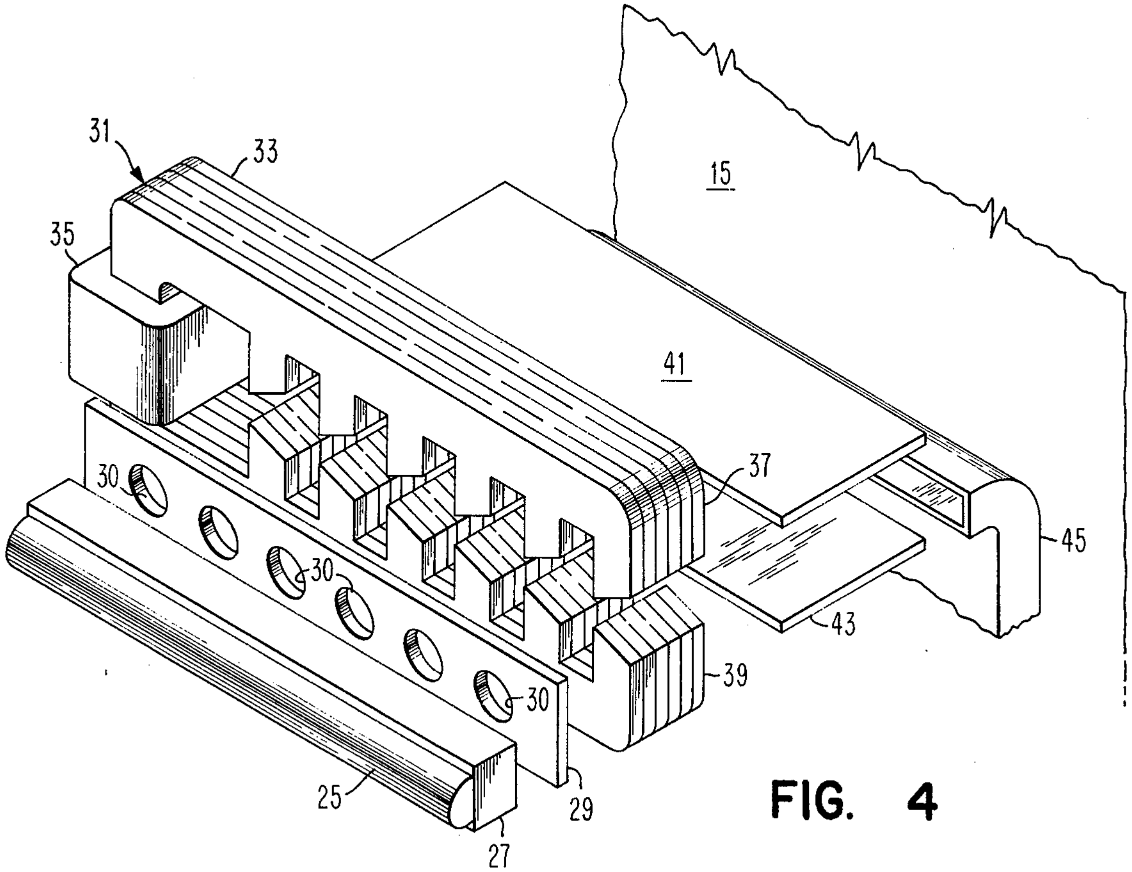
FIG. 4 is a diagrammatic view of a multiple-nozzle arrangement of ink jet printing apparatus employing the present invention.

This combination also provides a good configuration for a multiple head unit, as illustrated in FIG. 4, wherein one assembly is provided for each major component. As shown, there are provided a common exciting crystal 25, a nozzle plate 27 bearing a plurality of spaced nozzles, a charge plate 29 having a plurality of charge electrodes 30, one for each ink stream position, a magnetic deflection assembly 31 comprising a common magnetic core 33, having a winding 35 mounted thereon, and having a plurality of opposed pole pieces, such as 37 and 39, one pair for each ink stream position. A pair of common deflecting plates or electrodes 41 and 43 extend over the range of the ink stream positions, as does a common gutter 45.

Figure 5:
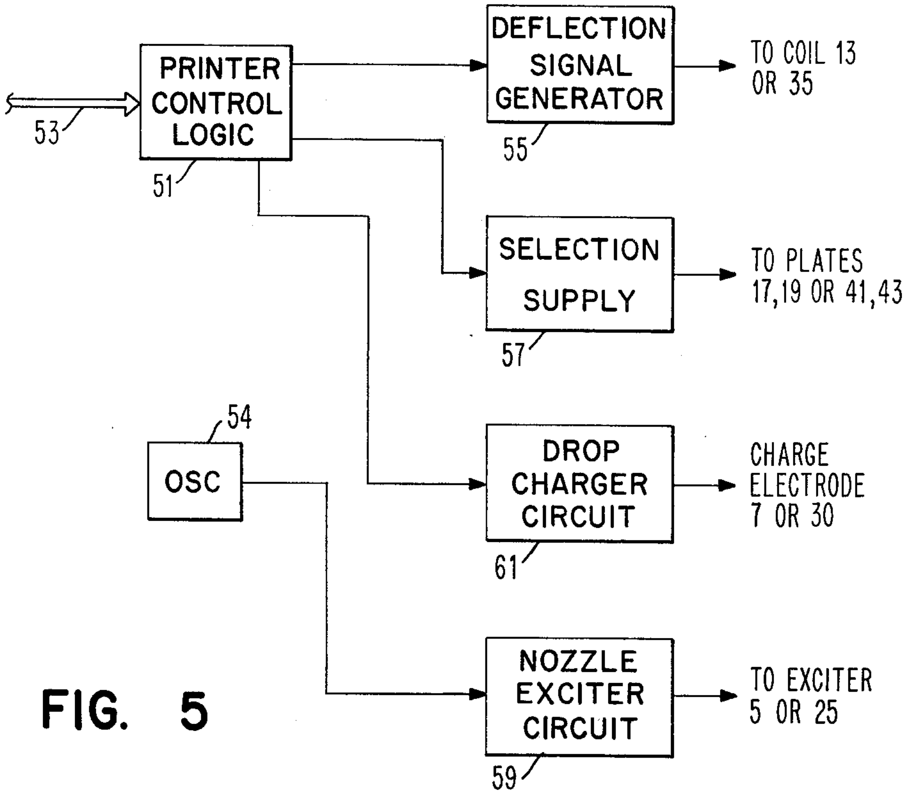
FIG. 5 is a schematic block diagram of circuitry which may be used with the apparatus of the invention.

The circuitry for operating apparatus in accordance with the invention is considered conventional and well known in the ink jet printing art, and can have a configuration as shown in FIG. 5. Input signals to the printer control logic 51 arrive via signal lines 53. The printer control logic controls the delivery of signals from deflection signal generator 55, which provides a suitable current waveform output to the deflection coil 13 (35 in FIG. 4). Also, the printer control logic 51 enables the power supply 57, which in turn supplies a suitable voltage to deflection electrodes 17 and 19 (41, 43 in FIG. 4).

Oscillator 54 supplies signals to govern the nozzle exciter circuit 59, which supplies the electrical drive to exciter 5 (25 in FIG. 4). The printer control logic 51 governs the supply of signals to the drop charger circuit 61, which supplies energy to the individual charging electrodes 7, or 30 in FIG. 4, in concurrence with the information to be printed.

From the foregoing, it will be apparent that this invention provides a novel method and apparatus for ink jet printing, in which the disadvantages of both magnetic and electrostatic deflection are minimized, by serially applying, to the ink drops, magnetic deflection followed by electrostatic drop selection.

In the preferred mode, multiple drops are selected for printing asynchronously, that is, the drop selection rate is not synchronized with the drop excitation rate. However, other options include the use of a selection rate and excitation rate synchronized with multiple drops per matrix position, as well as with a single drop per matrix position.

While the invention has been particularly shown and described with reference to preferred embodiments thereof, it will be understood by those skilled in the art that the foregoing and other changes in form and details may be made therein without departing from the spirit and scope of the invention.

We claim:

1. A method of controlling the flight of liquid drops comprising the steps of generating a stream of drops of electrically conductive magnetizable liquid along a path toward an impacting surface;

inducing electrical charges on selected ones of said drops;

creating a variable magnetic force field of nonuniform flux density across said path to urge deflection of a series of said drops from said path to impact said surface along a line; and establishing an electrostatic force field across said path for deflection of said charged drops from said path along a discard trajectory.

2. A method as claimed in claim 1, including the further steps of collecting the drops in said discard trajectory.

3. A method as claimed in claim 1 wherein the deflection of said drops in said electrostatic field is orthogonal to the deflection produced in said magnetic field.

4. A method as claimed in claim 3 in which the deflection in said magnetic field is horizontal and the deflection in said electrostatic field is vertical.

5. Apparatus for ink jet printing comprising, in combination, drop generating means for projecting a sequence of uniformly spaced drops of magnetizable ink in a path toward a recording medium drop charging means for inducing an electrical charge on selected ones of said drops, magnetic deflection means for creating a variable magnetic force field of nonuniform flux density across said path to urge deflection of a series of said drops from said path to impact said surface along a line, and electrostatic deflection means following said magnetic deflection means for establishing an electrostatic force field across said path for deflection of said charged drops from said path along a discard trajectory.

6. Apparatus as claimed in claim 5, in which the fields established by said magnetic deflection means and said electrostatic deflection means are orthogonal with respect to each other.

7. Apparatus as claimed in claim 5 in which the deflection of said drops in said magnetic field is horizontal and the deflection of said drops in said electrostatic field is vertical.

8. Apparatus as claimed in claim 5 further including collector means for collecting drops traveling in said discard trajectory.

* * * * *